US011811783B1

(12) United States Patent
Suleiman et al.

(10) Patent No.: US 11,811,783 B1
(45) Date of Patent: Nov. 7, 2023

(54) PORTABLE ENTITLEMENT

(71) Applicant: Amazon Technologies, Inc., Seattle, WA (US)

(72) Inventors: Hani Suleiman, New York, NY (US); Steve Huynh, Seattle, WA (US); James Mutton, Maple Valley, WA (US); Charles Benjamin Waggoner, Portland, OR (US); Prasanth Saraswatula, Bellevue, WA (US); Andrew James McVeigh, Malibu, CA (US); Benjamin Raphael Forman, Watford (GB)

(73) Assignee: Amazon Technologies, Inc., Seattle, WA (US)

( * ) Notice: Subject to any disclaimer, the term of this patent is extended or adjusted under 35 U.S.C. 154(b) by 316 days.

(21) Appl. No.: 17/304,737

(22) Filed: Jun. 24, 2021

(51) Int. Cl.
*H04L 9/40* (2022.01)
*G06F 21/60* (2013.01)
*H04N 21/258* (2011.01)
*H04N 21/266* (2011.01)
*G06Q 20/12* (2012.01)

(52) U.S. Cl.
CPC .......... *H04L 63/108* (2013.01); *G06F 21/602* (2013.01); *H04L 63/107* (2013.01); *H04N 21/25841* (2013.01); *H04N 21/26606* (2013.01); *G06F 2221/2145* (2013.01); *G06Q 20/1235* (2013.01); *G06Q 2220/10* (2013.01)

(58) Field of Classification Search
CPC ... H04L 63/108; H04L 63/107; G06F 21/602; G06F 2221/2145; H04N 21/25841; H04N 21/26606; G06Q 20/1235; G06Q 2220/10
See application file for complete search history.

(56) References Cited

U.S. PATENT DOCUMENTS

| 9,332,434 | B1* | 5/2016 | Dotan | H04W 12/06 |
| 10,102,648 | B1* | 10/2018 | Vannier | G06F 21/105 |
| 10,129,257 | B2* | 11/2018 | McGovern | H04L 63/20 |
| 10,454,906 | B1* | 10/2019 | Sharfman | H04L 63/0428 |
| 10,735,910 | B1* | 8/2020 | Dharmar | H04L 67/146 |
| 10,911,428 | B1* | 2/2021 | Roth | H04L 9/3213 |
| 10,992,669 | B2* | 4/2021 | Correa | G06F 21/35 |
| 11,030,339 | B1* | 6/2021 | Ilincic | H04L 9/0819 |
| 11,165,999 | B1* | 11/2021 | Wieder | G06Q 20/3825 |
| 11,245,682 | B2* | 2/2022 | Kukreja | G06F 21/335 |
| 11,481,837 | B1* | 10/2022 | Brandt | G06F 21/45 |
| 2004/0054629 | A1* | 3/2004 | de Jong | H04L 65/612 |
| | | | | 705/51 |

(Continued)

*Primary Examiner* — Darren B Schwartz
(74) *Attorney, Agent, or Firm* — Weaver Austin Villeneuve & Sampson LLP

(57) ABSTRACT

Some implementations include methods for generating a portable entitlement for a digital asset and may include generating a portable entitlement to a digital asset based on a request initiated by a first user having an entitlement to the digital asset, the portable entitlement to enable the first user to access the digital asset using a second computing device of a second user, the request initiated using a first computing device of the first user, the portable entitlement having a limited lifetime; and terminating the second computing device from accessing the digital asset based on one or more of determining that a proximity between the first and second computing devices violate the distance threshold and the lifetime of the portable entitlement has expired.

20 Claims, 7 Drawing Sheets

(56) References Cited

U.S. PATENT DOCUMENTS

| | | | |
|---|---|---|---|
| 2004/0103202 A1* | 5/2004 | Hildebrand | H04L 63/20 709/229 |
| 2004/0220878 A1* | 11/2004 | Lao | H04L 63/20 705/51 |
| 2005/0131583 A1* | 6/2005 | Ransom | H04L 63/08 726/4 |
| 2008/0097921 A1* | 4/2008 | Kim | H04L 9/3297 705/53 |
| 2009/0106550 A1* | 4/2009 | Mohamed | H04L 63/045 713/156 |
| 2009/0228962 A1* | 9/2009 | Pathak | G06F 21/6209 726/5 |
| 2010/0268628 A1* | 10/2010 | Pitkow | G06Q 20/102 705/40 |
| 2011/0007903 A1* | 1/2011 | Robert | G06F 21/10 380/279 |
| 2013/0144755 A1* | 6/2013 | Mowatt | H04W 4/60 705/26.41 |
| 2014/0019758 A1* | 1/2014 | Phadke | H04N 21/4627 713/168 |
| 2014/0026193 A1* | 1/2014 | Saxman | G06F 21/33 726/4 |
| 2015/0047053 A1* | 2/2015 | Chen | H04L 63/08 726/28 |
| 2015/0237052 A1* | 8/2015 | Brique | G06F 21/6209 726/1 |
| 2015/0256973 A1* | 9/2015 | Raounak | H04W 12/069 726/7 |
| 2015/0326578 A1* | 11/2015 | Hsu | H04L 63/108 726/9 |
| 2015/0381602 A1* | 12/2015 | Grim | H04W 12/30 726/4 |
| 2016/0134488 A1* | 5/2016 | Straub | G06F 21/44 726/4 |
| 2016/0149881 A1* | 5/2016 | Rengan | H04L 63/107 726/7 |
| 2017/0310675 A1* | 10/2017 | Kodama | H04L 63/10 |
| 2019/0026841 A1* | 1/2019 | Kuo | G06F 21/105 |
| 2019/0207918 A1* | 7/2019 | Kurian | G06F 21/316 |
| 2019/0268643 A1* | 8/2019 | Raley | G06Q 20/1235 |
| 2021/0021601 A1* | 1/2021 | Valecha | H04L 9/0872 |
| 2021/0250359 A1* | 8/2021 | Yaacoby | H04L 63/0428 |
| 2021/0383004 A1* | 12/2021 | Manasse | G06F 21/6209 |
| 2021/0385204 A1* | 12/2021 | Chauhan | H04L 63/083 |

\* cited by examiner

PORTABLE ENTITLEMENT

BACKGROUND

An entitlement may confer a right to a user to access an asset. For example, the asset may be a video. When a user purchases a video, the user has the right or is entitled to access the video and play the video on a computing device. The entitlement may be limited to the user who purchased the video and may not be extended to someone else.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAILED DESCRIPTION

Figure 1:
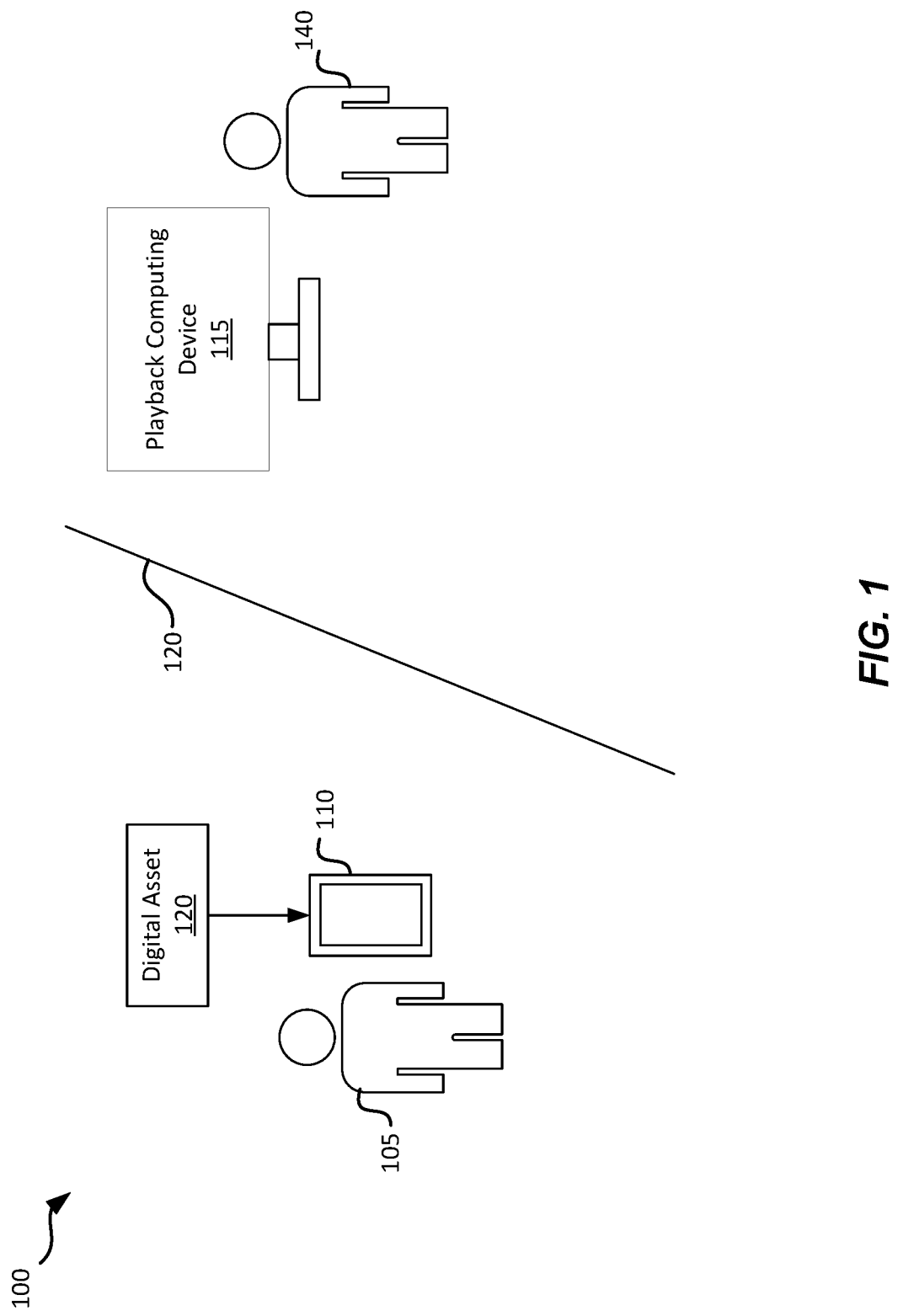
FIG. 1 shows an example environment that includes a playback computing device and a user with the entitlement to a digital asset, in accordance with some implementations.

This disclosure describes techniques for generating a portable entitlement of a digital asset. For example, the digital asset may be a video. A first user may be verified by an entitlement system to have an entitlement to the digital asset. For example, the entitlement may be obtained by paying a fee. Access to the digital asset may be obtained using a first computing device associated with the first user. A request to generate a portable entitlement of the digital asset may be initiated by the first user using the first computing device. The portable entitlement may be used to access the digital asset using a second computing device without requiring the first user to log in to the second computing device. The first computing device may be a mobile computing device. The second computing device may be associated with a second user who does not have any entitlement to the digital asset. The first computing device and the second computing device may be in close proximity of one another, and their locations may be known to one another. Both the first user and the second user may be members of a digital asset service associated with the digital asset.

The request to generate the portable entitlement may include an identifier of the digital asset, a user identifier of the first user, a user identifier of the second user, a location of the first computing device, a location of the second computing device, or a combination thereof. Based on receiving the request to generate the portable entitlement from the first computing device, the entitlement system may be configured to verify that the information included in the request is valid. Based on verifying that the information included in the request is valid, the entitlement system may be configured to generate a playback envelope which may include the information included in the request. In some implementations, the playback envelope may include information about a lifetime of the portable entitlement. In some implementations, the playback envelope may include information about rules or restrictions about accessing the digital asset. For example, there may be a region restriction such that the access to the digital asset may be blocked in certain region of the world. The playback envelope may be encrypted and may be transmitted to the second computing device via an application installed on the second computing device. For example, the application may be a client version of the Amazon Prime Video service. The second computing device may also be referred to as a playback computing device.

A visual representation of portable entitlement to the digital asset may be displayed on the playback computing device via the application based on receiving the playback envelope from the entitlement system. The visual representation of the portable entitlement may be selected to activate the portable entitlement. When the portable entitlement is activated, the playback envelope may be transmitted to a playback system. For example, a "play" button may be selected to cause the activation. The playback system may be configured to perform playability verification against a set of requirements.

The playability verification may include verifying the geographical location of the second computing device relative to a geographical location of the first computing device. When a difference between the geographical location of the second computing device and the geographical location of the first computing device violates a distance threshold, the portable entitlement may be considered invalid and the digital asset may not be accessed from the second computing device.

The playability verification may include keeping track of a play count limit of the digital asset associated with the first user. For example, if the play count limit is set at "1", and the digital asset is being accessed by the first user on the first computing device, then the playback system may prevent the digital asset from being accessed by the second computing device even when the second computing device has been granted the portable entitlement by the first user.

The playability verification may include keeping track of the lifetime of the portable entitlement. When the lifetime of the portable entitlement expires, the portable entitlement may be considered invalid and the digital asset may not be accessed from the second computing device. In some implementations, when a request for a renewal of the portable entitlement is received based on the expiration of the lifetime, a small fraction (e.g., 5%) of the lifetime may be allowed provided there is no violation of the distance threshold.

When the playback system determines that the necessary requirements are satisfied, the playback system may be configured to generate playback resources necessary to enable the digital asset to be accessed from the second computing device. The playback resources may be transmitted to the second computing device. For example, the playback resources may include content of the digital asset.

In some implementations, the playability verification may also be performed by the playback system while the digital asset is being accessed from the second computing device.

Examples of systems and methods associated with generating portable entitlement of a digital asset for playback on a playback device will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1 shows an example environment that includes a playback computing device and a user with the entitlement to a digital asset, in accordance with some implementations. Diagram 100 includes first user 105 who may be associated with the first computing device 110. The first user 105 may have the entitlement to the digital asset 120 and may be able to access the digital asset 120 on the first computing device 110 (shown by the arrow connecting the digital asset 120 to the first computing device 110). As noted below, the digital asset 120 may be managed by a digital asset service. The digital asset 120 may be delivered to the first computing device 110 by a streaming service or a video-on-demand service.

Diagram 100 also include a playback computing device 115 which may be owned by someone else such as, for example, second user 140. Line 120 is used to convey that there may be a geographical difference between a location of the playback computing device 115 and a location of the first user 105 and the first computing device 110. For example, the playback computing device 115 may be located at a residence of the second user 140. In some implementations, the first user 105 and the second user 140 may be associated with the same digital asset service 350 (shown in FIG. 2). An example of such a digital asset service is Amazon Prime Video from Amazon.com, Inc. of Seattle, Wash., and the users 105 and 140 may both be subscribers of the Amazon Prime Video service.

Figure 2:
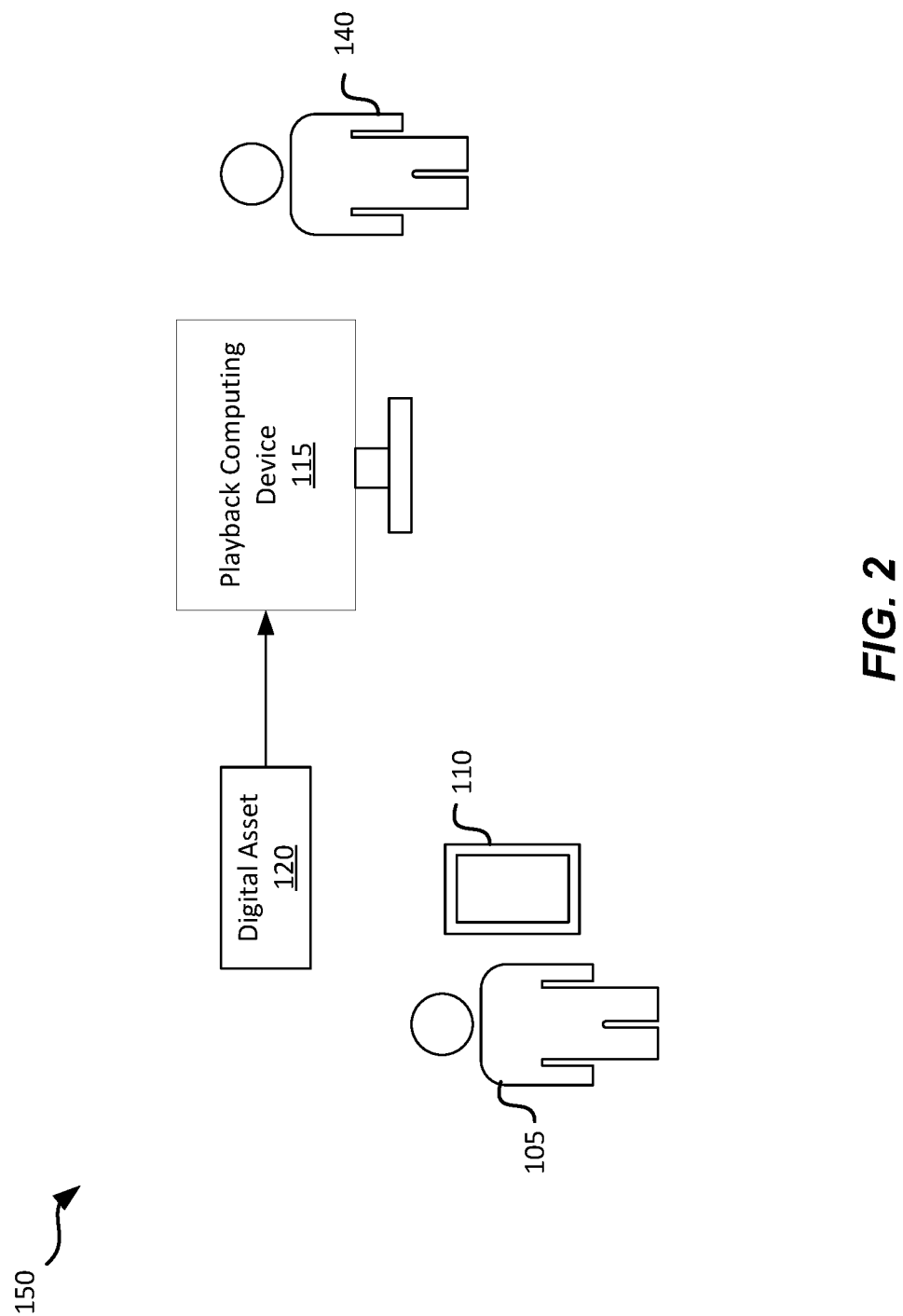
FIG. 2 shows an example environment that includes a playback computing device within a close proximity of a user with the entitlement of the digital asset, in accordance with some implementations.

FIG. 2 shows an example environment that includes a playback computing device within a close proximity of a user with the entitlement of the digital asset, in accordance with some implementations. Diagram 150 is similar to diagram 100 but without the line 120 to indicate that the first user 105 and the first computing device 110 may be within a close proximity of the playback computing device 115. When the first user 105 wants to access the digital asset 120 on the playback computing device 115, for example, to enjoy the digital asset 120 with the second user 140, the first user 105 may log into the service using the playback computing device 115. This may require the second user 140 to log out of the service if the second user 140 was previously logged in to the service. The first user 105 may then request to access the digital asset 120 from the playback computing device 115. The arrow connecting the digital asset 120 to the playback computing device 115 is used to indicate that the digital asset 120 may be accessed using the playback computing device 115.

Requiring the first user 105 to log into the service using the playback computing device 115 means that the first user 105 may need to log out of the service sometime later. This can present some potential challenges as the first user 105 may intentionally or unintentionally forget to log out, thus allowing the second user 140 to continue enjoying the digital asset 120 and any other digital assets that the first user 105 may have the entitlements for at the expense of the first user 105 and the digital asset service 350 (shown in FIG. 3).

Figure 3:
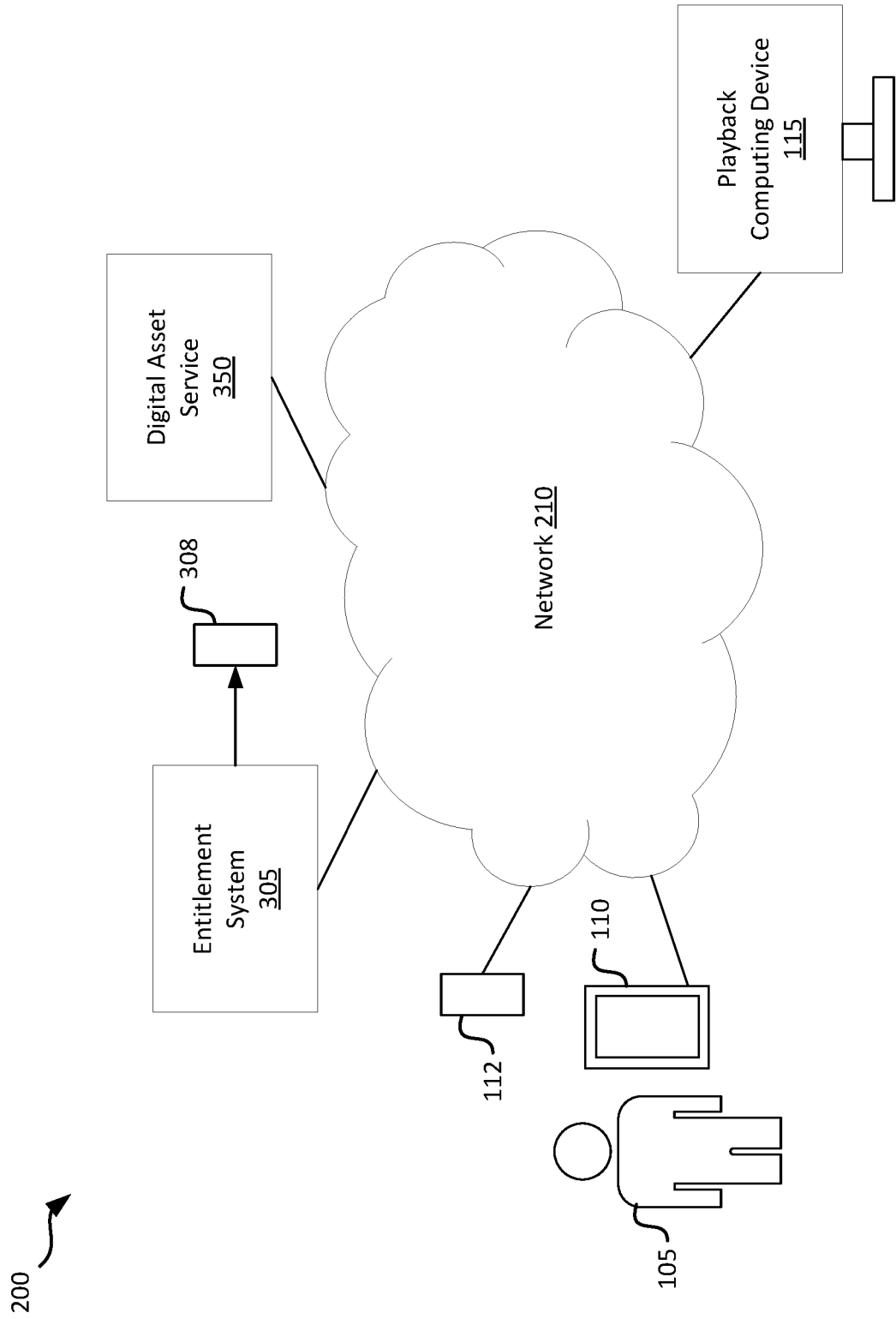
FIG. 3 shows an example network environment that may be used to generate a portable entitlement of a digital asset, in accordance with some implementations.

FIG. 3 shows an example network environment that may be used to generate a portable entitlement of a digital asset, in accordance with some implementations. Diagram 200 includes the first computing device 110 and the playback device 115 connected to the network 210. An entitlement system 305 and a digital asset service 350 may also be connected to the network 210. The digital asset service 350 may be configured to manage a plurality of digital assets, including the digital asset 120. In some implementations, the access to the digital asset 120 may be subject to a digital rights management (DRM) scheme used to control access to copyrighted materials. Access to the digital asset 120 may require user authentication, and a play count may be used to control the number of concurrent access to the digital asset 120 by different computing devices.

In this example, the first computing device 110 and the playback computing device 140 may be within a close proximity of one another. In some implementations, the playback computing device 115 may be identified based on being connected to the digital asset service 350 and based on being within a proximity of the first computing device 110.

In some implementations, the first computing device 110 may be configured to enable the first user 105 to initiate a request to generate a portable entitlement of the digital asset 120. For example, the first user 105 may log into the service using the first computing device 100 and select an option to request the generation of the portable entitlement for the digital asset 120. The request to generate the portable entitlement may require the first user 105 to provide a user identifier of the second user 140, information about the digital asset 120 such as, for example, the title of the digital asset 120, information about the playback computing device 115, a user identifier of the first user 105, or a combination thereof.

In some implementations, the first user 105 may initiate the request to generate the portable entitlement by using a voice-controlled device 112 configured with a personal assistant technology. For example, the voice-controlled device 112 may be an Echo device from Amazon.com, and the personal assistant technology may be Alexa from Amazon.com. The voice-controlled device 112 may be connected to the network 210 and may be configured to recognize the voice of the first user 105. Other forms of recognition may be used including, for example, biometric recognition, a special phrase, etc. The voice-controlled device 112 may be located in a close proximity to the playback computing device 115. The voice command uttered by the first user 105 to the voice-controlled device 112 may include information about the digital asset 120, a user identifier of the second user 140, a user identifier of the first user 105, and information about the playback device 115, or a combination thereof. In some implementations, the personal-assistant technology may be installed on the first computing device 110, and the first user 105 may utter the voice command to request for the generation of the portable entitlement using the first computing device 110.

The request to generate the portable entitlement may be transmitted to the entitlement system 305. In some implementations, the entitlement system 305 may be configured to use the information included in the request for the generation of the portable entitlement to verify whether the first user 105 is authorized to initiate the request. For example, the entitlement system 305 may verify with the digital asset service 350 to determine whether the first user 105 has paid a fee for the right to access the digital asset 120. In some implementations, the entitlement system 305 may be configured to verify the validity of the user identifier of the second user 140. For example, the entitlement system 305 may deny the request for the generation of the portable entitlement if the entitlement system 305 determines that the first user 105 does not have the entitlement to the digital asset 120, or if the entitlement system 305 determines that the user identifier of the second user is not valid.

Based on confirming that the request for the generation of the portable entitlement is valid, the entitlement system 305 may be configured to generate a playback envelope 308. In some implementations, the playback envelope 308 may include information that is received by the entitlement system 305 via the request to generate the portable entitlement. A lifetime of the portable entitlement and a play count limit of the digital asset may also be determined by the entitlement system 305 and included in the playback envelope 308. The entitlement system 305 may encrypt the playback envelope 308 and may associate or assign the encrypted playback envelope 308 with the second user 140 and the playback computing device 115. In some implementations, a notification may be generated to notify the second user 140 that the portable entitlement has been granted by the first user 105. In some implementations, the second user 140 may be able to view the portable entitlements that have been granted by the first user 105 and possibly by other users and be able to play or activate a selected portable entitlement.

Figure 4:
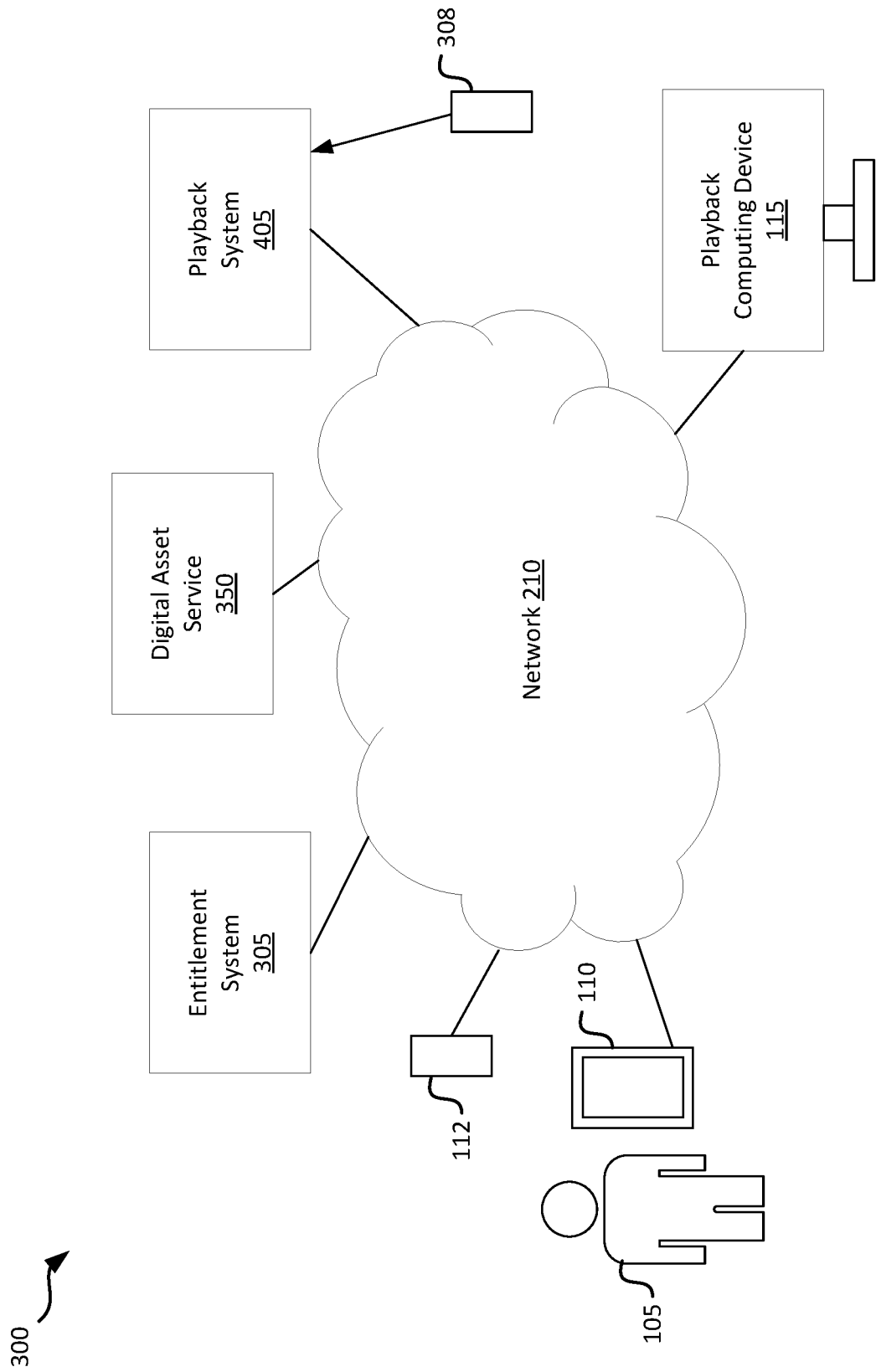
FIG. 4 shows an example network environment that may be used to access a digital asset using a portable entitlement, in accordance with some implementations.

FIG. 4 shows an example network environment that may be used to access a digital asset using a portable entitlement, in accordance with some implementations. Diagram 300 is similar to diagram 200 but with the addition of the playback system 405. In some implementations, based on the second user 140 receiving a notification that the portable entitlement has been granted by the first user 105, the second user 140 may activate the portable entitlement to access the digital asset 120 using the playback computing device 115. In some implementations, the first user 105 may activate the portable entitlement by uttering a voice command using the first computing device 110.

In some implementations, when the portable entitlement is activated, the encrypted playback envelope 308 associated with the portable entitlement may be transmitted to the playback system 405. In some implementations, the playback system 405 may be configured to decrypt the previously encrypted playback envelope 308. The playback system 405 may be configured to perform playability verification before allowing the playback computing device 140 to have access to the digital asset 120. The playability verification may include distance verification, play count verification, lifetime verification, playback user verification, region verification, or a combination thereof.

A distance threshold may be used by the playback system 405 to determine whether the first user 105 stays within a close proximity of the playback computing device 115 while the digital asset 120 is being accessed by the playback computing device 115. This may be performed based on the geographical location of the first computing device 110 and the geographical location of the playback computing device 140. When the playback system 405 detects that the distance threshold is violated, the access to the digital asset 120 may be terminated. In some situations, it may be possible to request for the portable entitlement to be renewed when the access to the digital asset 120 is terminated because of the distance threshold. The distance threshold may be set by the entitlement system 305 or the playback system 405. When the distance threshold is set by the entitlement system 305, the distance threshold may be included in the playback envelope 308.

A play count or stream count may be used by the playback system 405 to determine whether a number of concurrent accesses to the digital asset 120 may exceed a predetermined play count limit. In some implementations, the play count limit may be set by the entitlement system 305. For example, the play count limit may be set based on the amount of fee paid by the first user 105 to have access to the digital asset 120. When the play count limit is exceeded, the playback system 405 may prevent the digital asset 120 from being accessed by the playback computing device 115. In some situations, it may be possible to request for the portable entitlement to be renewed when the access to the digital asset 120 is terminated because of the play count.

A lifetime of the portable entitlement may be used by the playback system 405 to determine when the portable entitlement may expire and the access to the digital asset 120 may be terminated. As noted above, the lifetime of the portable entitlement may be determined by the entitlement system 305. It may be noted that the lifetime of the portable entitlement may be affected prematurely due to the distance threshold being violated. In some situations, it may be possible to request for the portable entitlement to be renewed when the access to the digital asset 120 is terminated before the expiration of the lifetime of the portable entitlement.

A user identifier of the second user may be used by the playback system 405 to determine whether the portable entitlement is being used to access the digital asset 120 by the intended user on the playback computing device 115. The playback system 405 may access the user identifier of the second user 140 from the encrypted playback envelope 308 and compare that with the user identifier of the second user 140 associated with the playback computing device 115. When the two user identifiers are not the same, it may be possible that the portable entitlement has been copied or forwarded by someone else, and the access to the digital asset 120 may not be allowed to proceed.

The digital asset 120 may be blocked from being accessed in certain geographical locations, and it may be associated with rules about who can or cannot access it. These rules or restrictions may be provided by the entitlement system 305 in the playback envelope 308. The playback system 405 may be configured to verify a region associated with a geographical location of the playback computing device 115 to determine whether the digital asset 120 can be accessed by the playback computing device 115. The playback system 405 may be configured to verify the user profile of the second user 140 to determine whether any of the rules may be applicable to block the second user 140 from accessing to the digital asset 120. In some implementations, the rules or restrictions may be related to properties of the digital asset 120 including, for example, resolution quality such as ultra-high definition (UHD) or 4K, and the playback computing device 115 may need to downgrade the resolution if the playback computing device 115 is not capable of supporting high resolution. Another example of the properties of the digital asset may be related to the screen size, and the playback computing device 115 may need to perform some adjustment to accommodate the screen size requirement.

In some implementations, when the playback system 405 determines that the necessary requirements are satisfied, the playback system 405 may be configured to generate playback resources necessary to enable the digital asset 120 to be accessed by the playback computing device 115 without requiring the first user 105 to log in to the playback computing device 115.

When the portable entitlement is terminated by the playback system 405, it's possible to renew the portable entitlement if the condition that causes the termination is corrected. For example, when the termination is caused by violating the distance threshold, the return of the first user 105 to within a close proximity of the playback computing device 115 may enable the playback system 405 to renew the portable entitlement. When the termination is caused by violating the play count, stopping the access to the digital asset 120 from another computing device may remove the play count violation and may enable the playback system 405 to renew the portable entitlement. In some implementations, the portable entitlement may be renewed for a period of time that is shorter than the lifetime of the portable entitlement.

In some implementations, the request for the generation of the portable entitlement may be initiated so that the digital asset 120 may be accessed using any playback computing device that is connected to the digital asset service (e.g., Amazon Prime Video). For example, the playback computing device 115 may be a third-party computing device located in a hotel room, in a library, or in a public place where it may be used by other people at different times. The playback computing device 115 may be connected to the digital asset service 350 via a streaming device such as a Fire TV Stick from Amazon.com. In this example, there may not be a user identifier of a second user as described with FIG. 2, but the location of the playback computing device may be identified by the playback system 405 based its location being in close proximity with the user 105 and the first computing device 110.

In some implementations, the portable entitlement may be cancelled by the first user 105 at any time. The cancellation may disassociate the portable entitlement from the second computing device 115 and the second user 140. The cancellation may occur after the portable entitlement is generated and before the portable entitlement is activated. The cancellation may occur after the portable entitlement is activated and before the expiration of the lifetime of the portable entitlement. In some implementations, when the portable entitlement is cancelled, the portable entitlement may not be renewed by the playback computing device 115. In some implementations, the cancelation of the portable entitlement may be performed using the first computing device 105.

It may be noted that the entitlement system 305 and the playback system 405 are shown in FIG. 4 as two separate systems, and therefore, their operations may be independent of one another. For example, it may be possible that the operations to generate the encrypted playback envelope by the entitlement system 305 are not immediately followed by the operations to generate the playback resources by the playback system 405. In some implementations, the operations of the entitlement system 305 and the operations of the playback system 405 may be combined into one integrated system.

Figure 5:
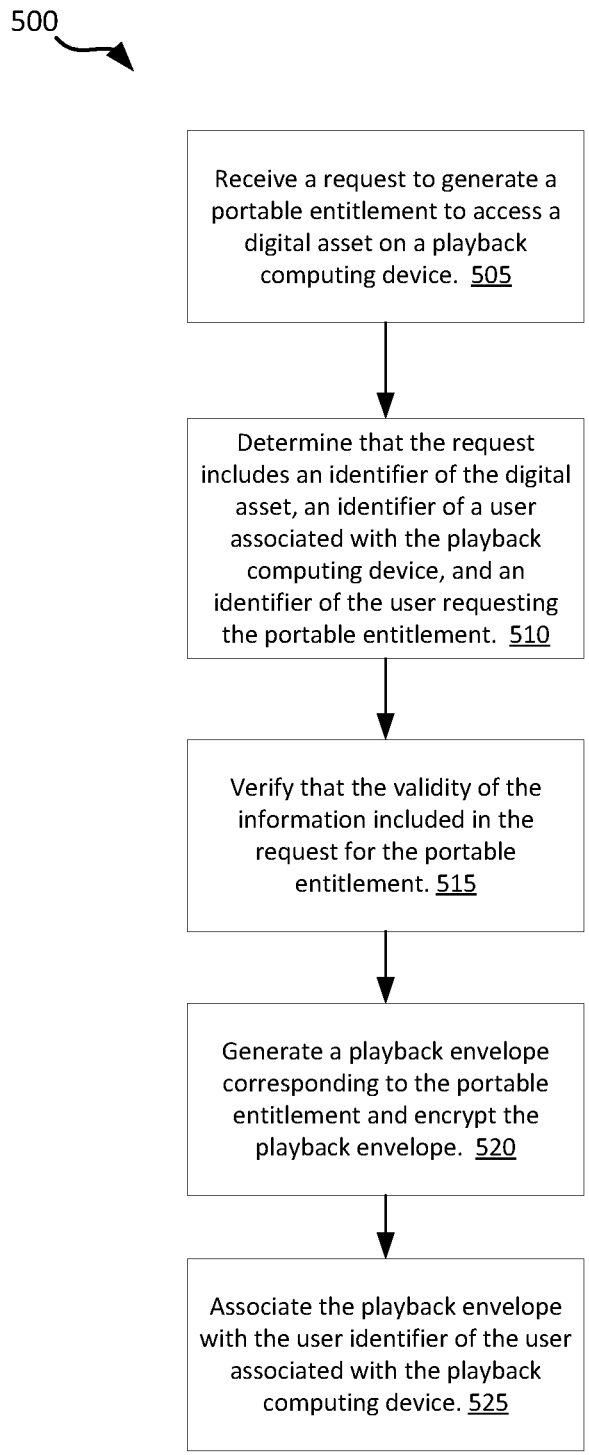
FIG. 5 shows an example process that may be performed by an entitlement system, in accordance with some implementations.

FIG. 5 shows an example process that may be performed by an entitlement system, in accordance with some implementations. The process 500 may include operations performed by the entitlement system 305 shown in FIG. 3. At block 505, a request to generate a portable entitlement to access a digital asset on a playback computing device may be received. For example, the request for the portable entitlement may be initiated by the first user 105 who has entitlement to the digital asset 120.

At block 510, the entitlement system may determine whether the request includes an identifier of the digital asset, an identifier of a user associated with the playback computing device, and an identifier of the user requesting the portable entitlement. When the request does not include the required information, the entitlement system may not process the request, and an error notification may be generated, and the process 500 may stop.

Based on the request including the required information, the entitlement system may proceed with verifying whether the included information is valid, as shown in block 515. This may include verifying that the user requesting the portable entitlement has entitlement to the digital asset. This may also include verifying whether the identifier of the digital asset is valid. When the information included in the request is determined to be invalid, an error notification may be generated and the process 500 may stop.

Based on the information included in the request determined to be valid, the entitlement system may generate a playback envelope corresponding to the portable entitlement, as shown in block 520. The playback envelope may include the information included in the request. The playback envelope may also include a lifetime of the portable entitlement and a play count limit of the digital asset. The playback envelop may be encrypted using an encryption scheme that is shared with the playback system so that the playback system can subsequently decrypt the playback envelope. For example, the encryption scheme may be based on a public private key pair with the entitlement system encrypting the playback envelope using a public key, and the playback system decrypting using a private key.

At block 525, the playback envelope may be associated with the user identifier of the user associated with the playback computing device. A notification may be generated by the entitlement system to indicate that the portable entitlement has been granted to the user associated with the playback computing device.

Figure 6:
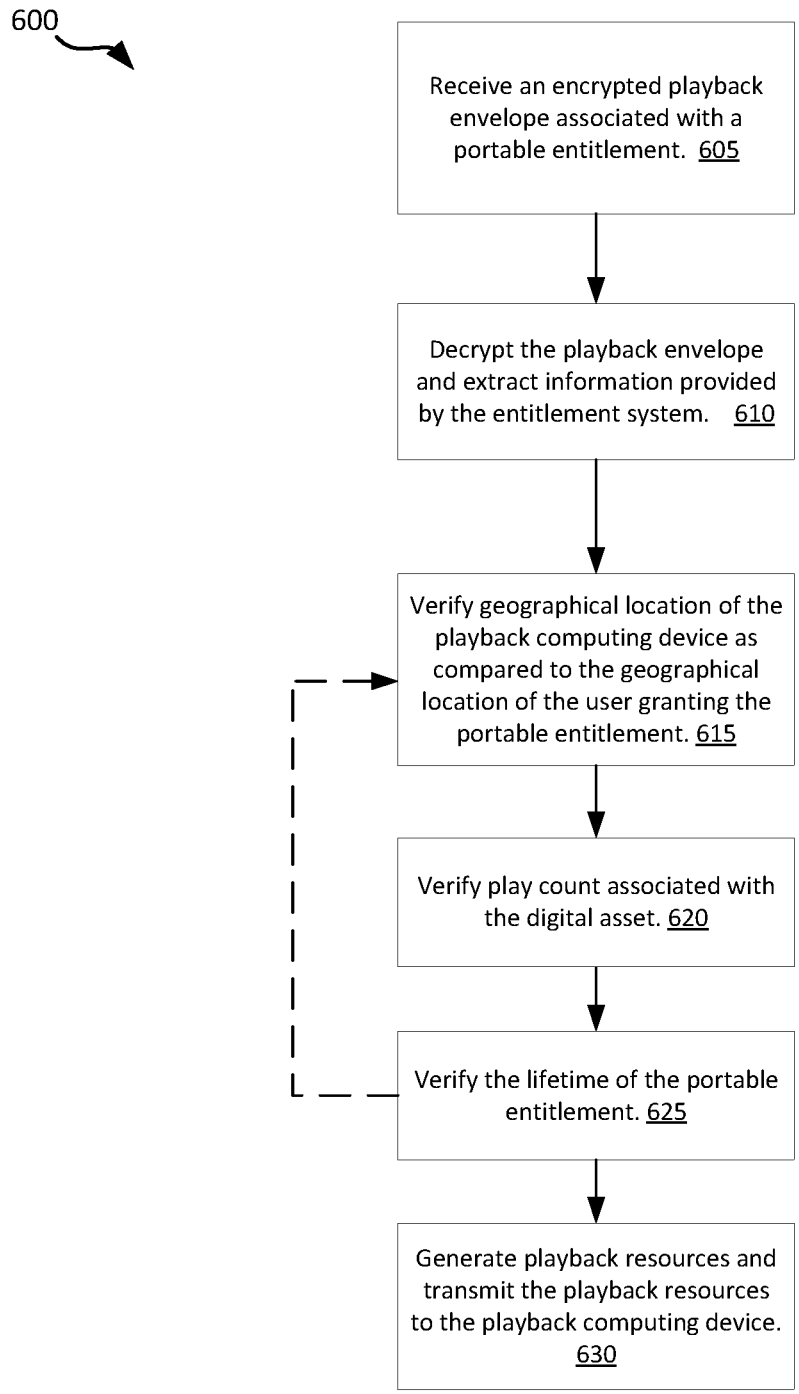
FIG. 6 shows an example process that may be performed by a playback system, in accordance with some implementations.

FIG. 6 shows an example process that may be performed by a playback system, in accordance with some implementations. The process 600 may include operations performed by the playback system 405, shown in FIG. 4. At block 605, an encrypted playback envelope is received by the playback system. The encrypted playback envelope may be transmitted to the playback system based on activating a portable entitlement that has been granted to a user associated with a playback computing device. At block 610, decryption operations may be performed to decrypt the previously encrypted playback envelope to extract the information that the entitlement system provided. For example, the information may include a lifetime of the portable entitlement and information about the digital asset.

At block 615, the playback system may verify the geographical location of the playback computing device and compare that with the geographical location of a computing device of the user granting the portable entitlement. A distance threshold may be used, and the process 600 may stop based on determining that the distance threshold is violated. For example, the user granting the portable entitlement may have gone home after granting the portable entitlement to the user associated with the playback computing device. The playback computing device may be stopped from accessing the digital asset.

At block 620, the playback system may verify the play count of the digital asset to determine whether a number of concurrent accesses to the digital asset may exceed the play count. The process 600 may stop based on determining that the play count is violated, and the playback computing device may be stopped from accessing the digital asset.

At block 625, the playback system may verify the lifetime of the portable entitlement. As noted above, the lifetime of the portable entitlement may expire. Initially, when the playback system first verifies the lifetime of the portable entitlement, the expiration of the lifetime of the portable entitlement may be unlikely to occur. However, since the verification operations performed by the playback system may also occur while the playback computing device is accessing the digital asset 120, the expiration of the lifetime of the portable entitlement may be more likely.

Based on successful playability verification by the playback system, the playback system may be configured to generate playback resources and transmit the playback resources to the playback computing device to enable the playback computing device to access the digital asset 120. As noted above, the playability verification performed by the playback system may occur while the playback computing device is accessing the digital asset 120. This is illustrated as the dashed line connecting block 625 to block 615.

Figure 7:
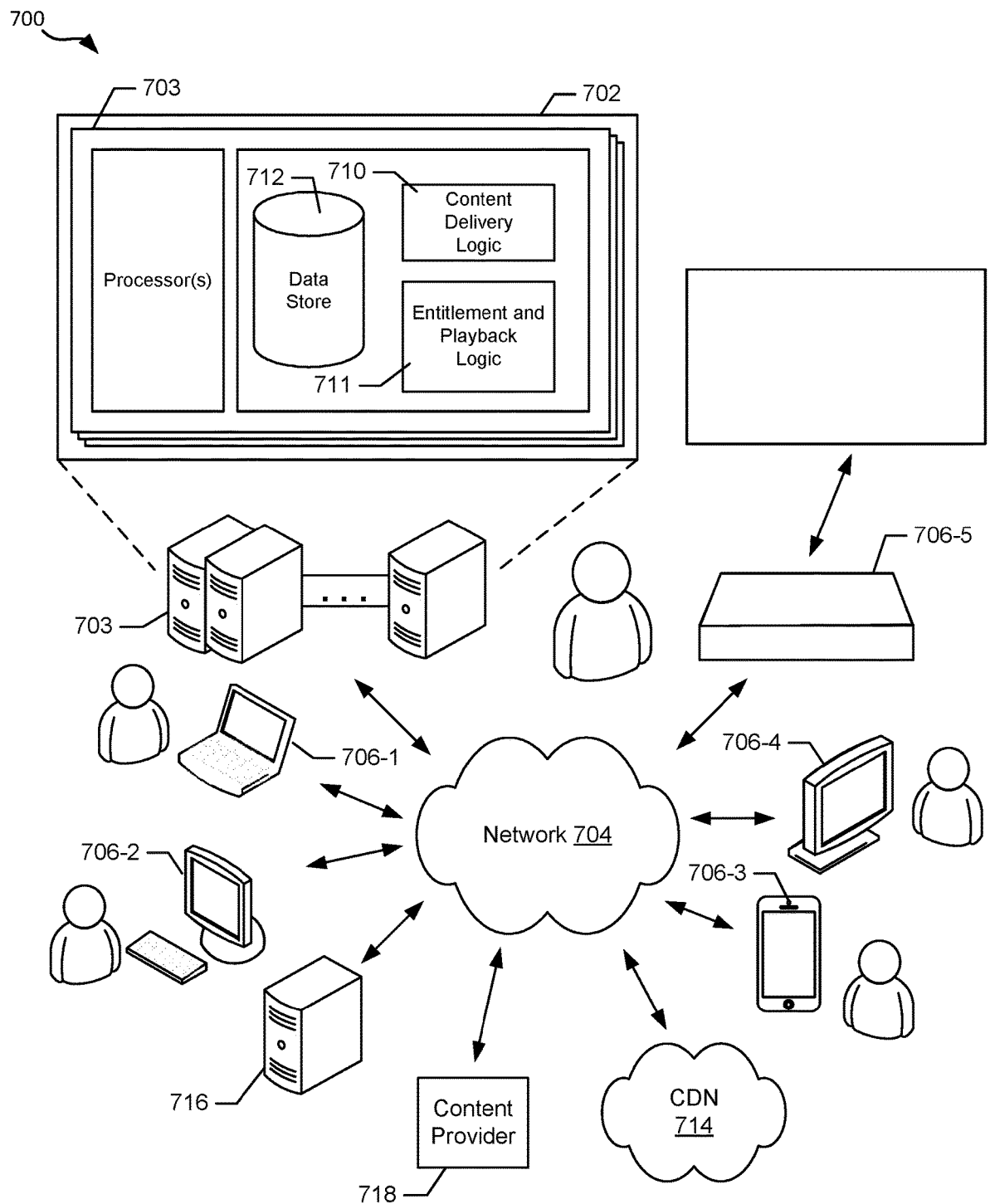
FIG. 7 shows a diagram of an example computing environment that may be used with some implementations.

FIG. 7 shows a diagram of an example computing environment that may be used with some implementations. Diagram 700 includes a computing environment in which a video content service 702 provides video content via network 704 to a variety of client devices (706-1 through 706-5) in accordance with the techniques described herein. The video content may include live or broadcast content or video-on-demand (VOD) content. In various implementations, the video content may be a video presentation of a live event (e.g., a livestream, broadcast, and/or camera feed of an ongoing live event and/or a recording of a partially or fully-completed event which may also be referred to as formerly-live event). Content service 702 may conform to any of a wide variety of architectures such as, for example, a services platform deployed at one or more co-locations, each implemented with one or more servers 703. Network 704 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 706 may be any suitable device capable of connecting to network 704 and consuming content provided by service 702. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 702. Alternatively, such resources may be independent of content service 702, e.g., on a platform under control of a separate provider of computing resources with which content service 702 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the examples herein and for the sake of simplicity, content service 702 is described as if it is integrated with the platform(s) that provides both broadcast content and VOD-style content to client devices. However, it will be understood that content service 702 may provide access to content in conjunction with one or more content delivery networks (e.g., CDN 714) that may or may not be independent of content service 702. In addition, the source(s) of one or both of the broadcast and VOD-style content may or may not be independent of content service 702 (e.g., as represented by content provider server 716, and live content provider 718). The range of variations known to those of skill in the art are contemplated to be within the scope of this disclosure.

Some of the implementations enabled by the present disclosure contemplate logic resident on the client devices consuming video content from content service 702; such logic might be configured to handle, for example, requesting smaller chunks of subtitle files. Such logic might be part of an existing algorithm or module on the client device or implemented to work in conjunction with such an algorithm or module.

It should also be noted that implementations are contemplated in which, in addition to content delivery logic 710 (which facilitates various aspects of content delivery to client devices 706), content service 702 may include other types of logic, e.g., entitlement logic and playback logic 711 that facilitates the generating of the portable entitlement for a digital asset. Although the entitlement logic and the playback logic 711 is shown as one logic, it may be possible that they are two separate logic. Although the entitlement logic and the playback logic 711 is shown to be associated with the content service 702, it may be possible that the entitlement logic and the playback logic 711 is associated with the content service 702 and/or a third-party service.

In addition to providing access to video content, content service 702 may also include a variety of information related to the video content (e.g., non-burned-in subtitle information, and other associated metadata and manifests in data store 712 to which service 702 provides access). Alternatively, such information associated with and/or about the content, as well as the content itself may be provided and/or hosted by one or more separate platforms, e.g., CDN 714. It should be noted that, while logic 710 and 711, and data store 712 are shown as integrated with content service 702, implementations are contemplated in which some or all of these operate remotely from the associated content service, and/or are under the control of an independent entity. From these examples, those of skill in the art will understand the diversity of use cases to which the techniques described herein are applicable.

Although implementations have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain implementations could include, while other implementations do not include, certain features, elements, and/or steps. Thus, such conditional language is not generally intended to imply that features, elements, and/or steps are in any way required for one or more implementations or that one or more implementations necessarily include logic for deciding, with or without user input or prompting, whether these features, elements, and/or steps are included or are to be performed in any particular implementation.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method comprising:
   receiving a request to generate a portable entitlement to a digital asset, the request initiated from a first computing device by a first user having entitlement to the digital asset, the portable entitlement to be granted by the first user to a second user associated with a second computing device;
   verifying that the request to generate the portable entitlement includes information identifying an identifier of the digital asset, a user identifier of the second user, and a user identifier of the first user;
   based on successful verification of the request, verifying validity of the information included in the request;
   based on successful verification of the validity of the information included in the request, determining a lifetime of the portable entitlement, a play count limit of the digital asset, and restrictions about accessing the digital asset;
   generating a playback envelope to include the information included in the request, the play count limit of the digital asset, the lifetime of the portable entitlement, and the restrictions about accessing the digital asset;
   encrypting the playback envelope using an encryption scheme to generate an encrypted playback envelope; and
   associating the encrypted playback envelope with the second user, the encrypted playback envelope associated with the portable entitlement enabling the digital asset to be accessed using the second computing device without the first user having to log in to the second computing device.

2. The method of claim 1, further comprising:
   receiving the encrypted playback envelope from the second computing device based on recognizing a command issued by the first user to activate the portable entitlement;
   decrypting the encrypted playback envelope using the encryption scheme to extract at least information about the digital asset, the lifetime of the portable entitlement, and the play count limit;
   determining geographical locations of the first computing device and of the second computing device;
   confirming that the geographical locations of the first computing device and of the second computing device does not violate a distance threshold;
   based on confirming that the distance threshold is not violated, confirming that the play count limit is not violated;
   based on confirming that the play count limit is not violated, generating playback resources based on the information about the digital asset;
   transmitting the playback resources to the second computing device to enable the second computing device to access the digital asset.

3. The method of claim 2, further comprising:
   validating proximity of between the first computing device and the second computing device while the digital asset is being accessed by the second computing device; and
   terminating the second computing device from accessing the digital asset based on determining that the proximity between the first computing device and the second computing device violates the distance threshold.

4. The method of claim 3, further comprising:
   receiving a request to renew the portable entitlement subsequent to a termination of the portable entitlement based on a violation of the distance threshold; and
   renewing the portable entitlement based on determining that the violation of the distance threshold is corrected and based on determining that the lifetime of the portable entitlement has not expired.

5. The method of claim 2, further comprising:
   terminating the second computing device from accessing the digital asset based on determining that the lifetime of the portable entitlement has expired.

6. The method of claim 5, further comprising:
   receiving a request to renew the portable entitlement subsequent to a termination of the portable entitlement based on an expiration of the lifetime of the portable entitlement; and renewing the portable entitlement for a fraction of the lifetime of the portable entitlement based on determining that there is no violation of the distance threshold.

7. A computer-implemented method comprising:
generating a portable entitlement to a digital asset based on a request initiated by a first user having an entitlement to the digital asset, the portable entitlement to enable the first user to access the digital asset using a playback computing device, the request initiated using a first computing device of the first user, the portable entitlement having a limited lifetime;
enabling the digital asset to be accessed by the first user using the playback computing device without the first user having to log in to the playback computing device based on the first user activating the portable entitlement and based on the first user being within a close proximity of the playback computing device determined by a distance threshold; and
stopping the playback computing device from being used to access the digital asset based on one or more of determining that the first user not being within a close proximity of the playback computing device based on the distance threshold and expiration of the lifetime of the portable entitlement.

8. The method of claim 7, wherein the digital asset is associated with a play count limit, and wherein the enabling the digital asset to be accessed by the first user using the playback computing device is based on the play count limit not being violated.

9. The method of claim 8, wherein the first user is logged in to the first computing device when the request to generate the portable entitlement is initiated.

10. The method of claim 9, wherein the first user is not logged in to the playback computing device while the digital asset is accessed using the playback computing device during the lifetime of the portable entitlement.

11. The method of claim 10, further comprising:
receiving a request to renew the portable entitlement subsequent to stopping the playback computing device from accessing the digital asset based on a violation of the distance threshold; and
renewing the portable entitlement based on determining that the violation of the distance threshold is corrected and based on determining that the lifetime of the portable entitlement has not expired and there is no violation of the play count limit.

12. The method of claim 10, further comprising:
receiving a request to renew the portable entitlement subsequent to stopping the playback computing device from accessing the digital asset based on expiration of the lifetime of the portable entitlement; and
renewing the portable entitlement for a small fraction of the lifetime of the portable entitlement based on determining that there is no violation of the distance threshold and of the play count limit.

13. The method of claim 10, further comprising:
stopping the playback computing device from being used to access the digital asset based on receiving a request to cancel the portable entitlement from the first user via the first computing device.

14. A system comprising:
a non-transitory memory configured to store computer-executable instructions; and
at least one computer processor configured to access the memory and execute the computer-executable instructions to:
generate a portable entitlement to a digital asset based on a request initiated by a first user having an entitlement to the digital asset, the portable entitlement to enable the first user to access the digital asset using a playback computing device, the request initiated using a first computing device of the first user, the portable entitlement having a limited lifetime;
enable the digital asset to be accessed by the first user using the playback computing device without the first user having to log in to the playback computing device based on the first user activating the portable entitlement and based on the first user being within a close proximity of the playback computing device determined by a distance threshold; and
stop the playback computing device from being used to access the digital asset based on one or more of determining that the first user not being within a close proximity of the playback computing device based on the distance threshold and expiration of the lifetime of the portable entitlement.

15. The system of claim 14, wherein the digital asset is associated with a play count limit, and wherein the digital asset is enabled to be accessed by the first user using the playback computing device based on the play count limit not being violated.

16. The system of claim 15, wherein the first user is logged in to the first computing device when the request to generate the portable entitlement is initiated.

17. The system of claim 16, wherein the first user is not logged in to the playback computing device while the digital asset is accessed using the playback computing device during the lifetime of the portable entitlement.

18. The system of claim 17, further comprising instructions to:
receive a request to renew the portable entitlement subsequent to stopping the playback computing device from accessing the digital asset based on a violation of the distance threshold; and
renew the portable entitlement based on determining that the violation of the distance threshold is corrected and based on determining that the lifetime of the portable entitlement has not expired.

19. The system of claim 17, further comprising instructions to:
receive a request to renew the portable entitlement subsequent to stopping the playback computing device from accessing the digital asset based on expiration of the lifetime of the portable entitlement; and
renew the portable entitlement for a small fraction of the lifetime of the portable entitlement based on determining that there is no violation of the distance threshold.

20. The system of claim 17, further comprising instructions to:
stop the playback computing device from being used to access the digital asset based on receiving a request to cancel the portable entitlement from the first user via the first computing device.

* * * * *